Dec. 30, 1969          M. EVERS                    3,486,995
       METHOD AND APPARATUS FOR STRENGTHENING GLASS BY ION EXCHANGE
Filed Dec. 17, 1965                              2 Sheets-Sheet 1

INVENTOR.
BY Manfred Evers
Bauer + Seymour
ATTORNEYS

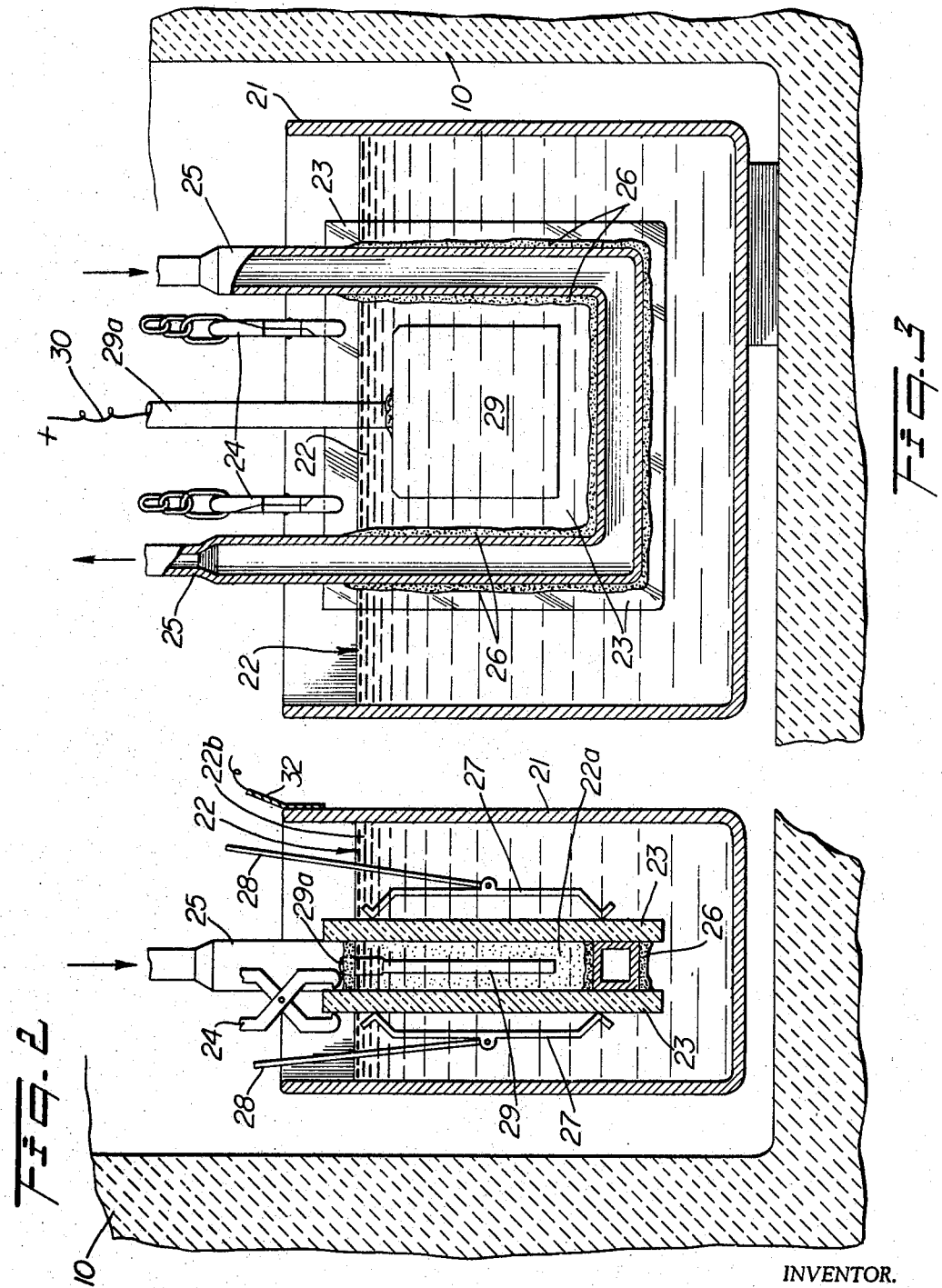

United States Patent Office 3,486,995
Patented Dec. 30, 1969

---

3,486,995
**METHOD AND APPARATUS FOR STRENGTH-
ENING GLASS BY ION EXCHANGE**
Manfred Evers, Aachen, Germany, assignor to Compagnie de Saint-Gobain, Neuilly-sur-Seine, France
Filed Dec. 17, 1965, Ser. No. 514,447
Claims priority, application France, Dec. 23, 1964,
999,744
Int. Cl. B01k *1/00*
U.S. Cl. 204—130     7 Claims

ABSTRACT OF THE DISCLOSURE

A practical and effective method and apparatus for strengthening glass by the exchange of ions from an electrolyte is achieved by establishing an electrical field through the glass and through an electrolyte in contact with the glass. The lines of force of the electrical field penetrate the glass. The glass is heated to give it a useful degree of electrical conductivity. A suitable electrolyte is a bath of a melted salt of potassium, rubidium, cesium. New apparatus is provided to carry out the process.

---

Figure 1:
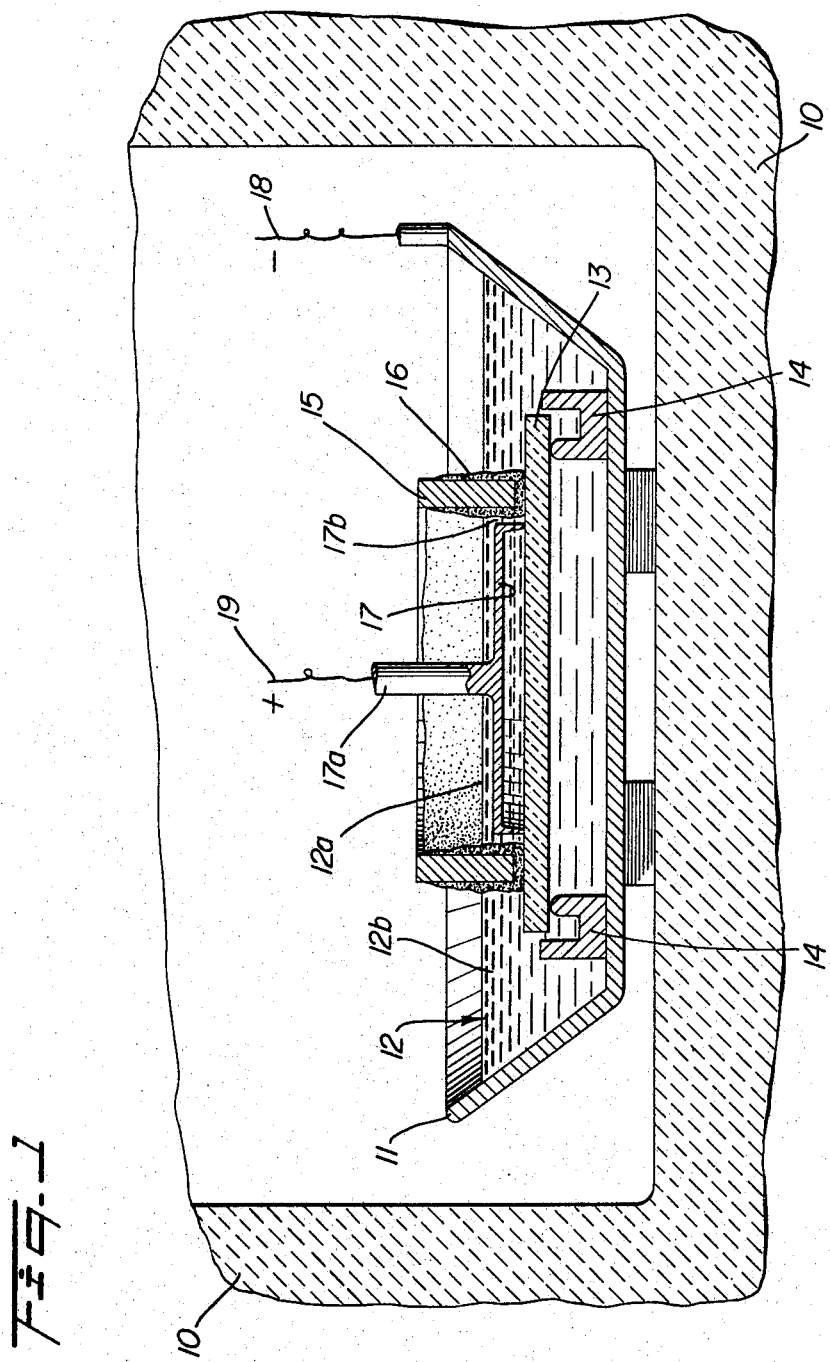

Priority for this application is claimed under 35 U.S.C. 119 based on French patent application No. 999,744 filed Dec. 23, 1964.

The present invention relates to an electrolytic method and apparatus for strengthening glass by exchanging and replacing ions in the surface layers of an article of glass with other ions having the same electric charge but of a different size.

The usual method of strengthening glass has been to temper it by heat treatment to create different degrees of stress in different layers through the glass. It is known, however, that glass may also be strengthened by ion exchange. One method consists in replacing small ions in the surface layers of glass by ions of a larger size having the same electric charge. For example, sodium ions in the surface of an article made of a soda-lime glass may be exchanged for potassium ions, which are larger, thereby creating compressive stresses in the surface layers and putting the inner layers under tension. To facilitate the exchange, the glass is heated but the temperature must be kept below the transformation point. The transformation point may be defined as the point at which this particular glass has a dynamic viscosity of $10^{13}$ poises.

In the absence of a field of electric potential, the ion exchange takes place by the laws of diffusion. The exchange takes place when, at a given temperature, the exponential function of the rate of movement of the ions to be exchanged coincides with their constant of diffusion, but with the temperature below the transformation point, as it must be to establish the desired stress differential in the glass, the speed of thermal diffusion is slight, and the exchange of ions progresses slowly. However, if an electric field is created in the area in which the exchange is to take place, the time required for a practical amount of ion exchange is considerably reduced. For this purpose, the article of glass, such as a sheet or plate, should be placed in contact with an electrolyte which contains the ion to be exchanged. The lines of force of the electric field favoring the ion exchange must penetrate the glass. The glass is therefore heated to give it a useful degree of electrical conductivity, but, of course, the temperature must be below the point of transformation. It is sufficient if the glass is at a temperature at which its specific electrical resistance is less than about $10^5$ ohms centimeter.

It is an object of the present invention to provide a practical and effective method and apparatus for strengthening glass by the exchange of ions from an electrolyte by creating an electric field through the glass and an electrolyte in contact with the glass.

In the practice of the present invention it is desired to have the electric field penetrate a large area of the glass article and for this purpose the electrolyte is divided in two volumes that are electrically insulated from each other and separated by the glass. Electrodes, namely an anode and a cathode, are placed in contact respectively with the volumes so that direct current electric power may be flowed through the glass from one volume of the electrolyte to the other.

A suitable electrolyte is a bath of a melted salt, such as salts of potassium, rubidium and cesium, or a mixture of them. In apparatus for carrying out the method, the tank which contains the electrolytic bath is in an oven which should be maintained at a working temperature above the melting point of the salt but below the transformation point of the glass. The working temperature should be a temperature at which the electrolyte has good electrical conductivity above about $10^{-3}$ mho/cm. The article of glass is placed in the oven with a surface in contact with the electrolyte, and the working temperature should be such that the glass is at a temperature at which it has a suitable degree of conductivity. As previously mentioned, this would be when the specific electrical resistance of the glass is less than about $10^5$ ohms centimeter. The glass will be suitably conductive when it is at a temperature between the melting point of the salt and the transformation point.

In the preferred form of apparatus, the electrolytic bath of melted salt is divided into two volumes, each being in contact with a different surface of the glass article and electrically insulated from the other by an insulating barrier that is formed in the bath by crystallizing and solidifying part of the salt of the electrolyte. The salt forming the barrier is crystallized and solidified by a cooling device placed in the both at an appropriate point for salt solidified on its surface to provide the insulating barrier at the proper location. It is only important that the barrier provide the desired insulating properties and while other insulating materials might be used, it has been found that a barrier of salt crystallized from the electrolytic bath provides a particularly reliable barrier having the necessary electric insulating properties.

As mentioned above, electrodes are placed in the respective volumes of the electrolytic bath which are separated by the insulating barrier and in contact with different surfaces of the glass article. A direct current electric potential is then applied across the electrodes so that direct current electric power flows through the glass from one volume of the bath to the other. When the electric conductivity of the melted salt of the bath is appreciably greater than the conductivity of the glass, an equipotential surface is formed at the surfaces of the glass that are in contact with the melted salt. When the glass article is a sheet or plate with parallel surfaces, the current density is uniform through the glass. In the course of the electrolysis provided by the difference in potential between the electrodes, the cations of melted salt penetrate the surface of the glass which is toward the anode. At the surface of the glass toward the cathode, the cations pass from the glass into the melted salt. If the ions which penetrate the glass at the anodic side are larger than the ions which pass out from the glass at the cathodic side, a layer of compressive stress is created at the anodic surface of the glass.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a vertical cross section through one embodiment of apparatus in accordance with the present invention;

FIG. 2 is a vertical cross section through another embodiment of apparatus in accordance with the invention; and FIG. 3 is a vertical longitudinal section through the apparatus of FIG. 2, being a view taken at right angles to the view of FIG. 2.

Referring now to the drawings, the apparatus illustrated in FIG. 1 comprises an oven 10 in which is disposed a shallow basin or tank 11 containing an electrolytic bath 12 of a melted salt. The oven is heated electrically, or by other suitable means, to maintain the temperature therein at a level above the melting point of the bath 12. The tank 11 is made of non-corresive material, such as stainless steel.

A sheet of glass 13 to be strengthened in accordance with the invention is immersed in the bath 12 and rests on supports 14 on the bottom of the tank. The supports 14 hold the sheet 13 up from the bottom of the tank so that the bath 12 makes good contact with the underside of the sheet 13.

A ring 15 of metal, such as a nickel-plated brass alloy, is pre-cooled outside the bath to a temperature in the order of −20° C. and is then placed in the bath 12 above the glass sheet 13 so that an insulating layer 16 of crystallized salt from the bath solidifies on the outer, inner and bottom surfaces of the ring. The dimensions of the ring 15 are less than the area of the glass sheet 13 so that it rests on the upper side of the glass sheet 13. When the ring is in position resting on glass sheet 13, as shown, its edges extend above the surface of the bath. The central portion of the ring thus encloses a volume 12a of the bath 12 in contact with the upper surface of the glass sheet 13 and separated and electrically insulated from the remaining volume 12b, which is outside and in contact with the under surface of the glass sheet.

An electrode 17, shown as an anode, is placed in the volume 12a of the bath inside the ring and is formed by a perforated plate of a suitable electrically conductive metal, such as nickel, having a shank 17a extending upward from the center and having a downwardly bent peripheral edge 17b which rests on the upper surface of the glass sheet 13 and spaces the body of the electrode slightly above the surface of the glass.

The other electrode, shown as a cathode, is formed by the tank 11 itself, and conductors 18 and 19 from the tank 11 and shank 17a of the electrode 17 connect them respectively to the negative and positive poles of a source of direct current electric power (not shown). The electric power is suitably supplied by a battery or from a supply of rectified alternating current and, with the connections shown, causes the direct current to flow through the glass sheet 13 from volume 12b to volume 12a of the bath 12 to produce the desired ion exchange which is described in more detail with reference to the following example:

EXAMPLE I

Using the apparatus of FIG. 1, the oven 10 was heated to a temperature of about 400° C. at which a bath 12 composed of technically pure potassium nitrate was in melted condition. The bath was about 3 cm. deep and a sheet 13 of soda-lime glass about 3 mm. thick was preheated in a separate preheating oven to a temperature of about 380° C. before being placed in the bath. The supports 14 on which the sheet 13 rested were of a height to provide about a 5 to 8 mm. depth of bath above the glass sheet 13.

The ring 15, which was about 20 mm. high and 8 mm. thick was precooled to about +20° C. outside of the bath. When the ring was then placed in the bath, a layer 16 of crystallized salt from the bath formed in 10 to 15 seconds to a thickness of about 1 to 2 mm. which had an electric resistance of over 0.1 megohm.

The electrode 17 of nickel was spaced above the sheet 13 about 5 mm. by its downturned edge 17b. The electric power was supplied across the electrodes at about 100 volts and supplied a current density of 2 milliamperes/cm.$^2$ at the surfaces of the glass. This current was maintained for 100 seconds. Equally good results were obtained and compressive stresses were produced in both surfaces of the glass sheet 13 when the current was applied in one direction for 90 seconds after which the poles were reversed and the current supplied in the reverse direction for the remaining 10 seconds.

The electrode 17 was then removed from the bath and the insulating layer 16 of crystallized salt melted after 2 or 3 minutes. Then the cooling ring 15 was lifted from the glass sheet 13 which was removed from the bath, allowed to cool in air and washed to remove salt which had adhered to it.

In a second embodiment of apparatus shown in FIGS. 2 and 3, a bath 22 of melted salt is contained in a narrow deep tank 21 of stainless steel. The tank is heated to the working temperature at which the bath is molten by being disposed in an oven 10. The apparatus of this embodiment is adapted to treat simultaneously two sheets 23 of glass which are suspended vertically in parallel relation in the tank by tongs 24.

Means to provide a barrier of electrical insulation in the bath 22 is provided by a hollow stainless steel tube 25 in the form of a U in the bath with the upper arms of the U extending out of the bath when they are connected to a source of a cooling fluid, such as cold air, which is circulated through the tube to cause salt from the bath to solidify on the tube and form an insulating layer 26 thereon. The glass sheets 23 are suspended at opposite sides of the U-shaped tube 25 and pressed against it by pressing members 27 pivoted on the ends of tringles 28. The upper edges of the glass sheets 23 extend slightly above the level of the bath 22, for example, about 10 mm. Thus, when cold air is blown through the tube 25 to crystallize an insulating layer 26 of salt on the exposed surfaces of the tube in the bath 22, the bath is separated into two volumes; a volume 22a in the center of the U-shaped tube between the glass sheets 23 and the remainder of the bath, being a volume 22b of the bath around the outward facing surfaces of the glass sheets.

The electrodes are provided respectively by a plate of nickel, designated electrode 29, suspended in the volume 22a of the bath in the center of the U-shaped tube 25 between the glass sheets 23 and by the tank 21 itself. The electrode 29, which is indicated as being the anode, has a shank 29a and is connected to one pole of a source of direct current electric power by a conductor 30. The tank 21 has a terminal post 31 fixed thereon with a conductor 32 from the terminal post to the other pole of the source of direct current.

The operation of the apparatus of FIGS. 2 and 3 is described in the following example:

EXAMPLE II

In apparatus illustrated in FIGS. 2 and 3, the oven was heated to a temperature of about 400° C. to assure the melting of the bath which consisted of melted potassium nitrate. The sheets 23 of glass were preheated to a temperature of about 380° C. Cold air to solidify a suitable insulating layer 28 of crystallized salt from the bath was circulated through the tube 25 at about 0.02 liters/sec.

The electric power was supplied across the electrodes at 100 volts and the current density provided at the surfaces of the glass sheets was 2 milliamperes/cm.$^2$ and was continued for 100 seconds. As in Example I satisfactory compressive stresses were also produced in both surfaces of both glass sheets 23 by passing the current in one direction for 90 seconds and then reversing the direction for the remaining 10 seconds.

After the desired electrolysis—after the current had been applied for 100 seconds—the flow of cold air through the tube 25 was stopped so that the layer 26 of solidified salt melted. The pressing members 27 were released, and the glass sheets were removed, cooled and washed. When the electrolysis is conducted by passing the current through the glass in only one direction, compressive stresses are formed in only one surface of the glass and augment the strength of the glass by exerting pressures which tend to force that surface toward a convex configuration.

The static strength of the sheet of glass produced by the ion exchange was measured by laying it across a ring 8 cm. in diameter and applying pressure exactly in the center. The same test procedure was applied to an untreated sheet of the same glass, and it was determined that the static strength of the treated sheet was 2.5 times that of the untreated sheet.

The dynamic resistance of the glass was measured using a dart standard of the type DIN 52.307 of which the shaft weighed 200 grams with a steel ball of 3.2 mm. in diameter at the tip. The height of fall required to break a piece of treated plate of glass 3 mm. thick was 150 cm., while the height of fall at which an untreated piece of the same glass broke was 70 cm.

It will be understood that the invention is not limited to the specific structure of the apparatus described with reference to the drawings or to the specific examples above.

For example, the method and apparatus in accordance with the invention may be applied to exchange ions from the surface of the glass for smaller ions of the same charge which would produce tension stress in the surface layer of the glass—or in the two opposite surfaces of a sheet if the current is applied in successively opposite directions in the manner described in the examples above.

In order to cause the ion exchange in both surfaces of the glass, the current applied in the reverse direction may be applied for a lesser time, as described in the examples, the pertinent factor being that the total electric load in terms of amperes per second applied in the reverse direction is 0–50% of the total load applied in the first direction.

When the method of this invention is to be used to produce compressive stress in the surface layer of glass by replacing sodium ions in the glass with larger ions of the same electric charge, the chemically monovalent ions of the alkali metals potassium, rubidium and cesium are suitable. All the salts of these elements that have a stable liquid phase temperature within the range between the temperature at which the glass is electrically conductive and the temperature of transformaion of the glass are suitable, especially potassium nitrate ($KNO_3$), potassium nitrite ($KNO_2$) and potassium dichromate ($K_2Cr_2O_7$) or mixtures thereof.

For the formation of the electric insulating barriers to separate the electrolytic bath into two volumes in contact with different surfaces of the glass by crystallizing and solidifying salt from the bath, the salts, as exemplified by the salts mentioned above, should preferably crystallize between about 30° to 70° C. below the operating temperature employed, and the specific electric resistance of the crystallized salt should preferably be more than $10^3$ times its specific resistance in the molten state. In this connection, it will be understood that solidification of the salt to form the described insulating barrier in the bath may be provided by other means than the cooled ring 15 of FIG. 1 or the tube 25 of FIGS. 2 and 3. For example, the crystallization may be accomplished by reducing the temperature of the bath at a selected location by blowing a stream of a cold gas on the surface of the bath or by apparatus permitting the elimination of heat by thermal radiation at the desired location.

The ion exchange treatment in accordance with this invention may also be applied to advantage to tempered glass to increase its strength. The relatively moderate temperature of this treatment, i.e., below the transformation point of the glass, and its short duration make it possible to add the properties imparted to the glass by this treatment to the properties produced in the glass by tempering without impairing the latter properties.

Although only a limited number of embodiments of the present invention have been illustrated in the accompanying drawings and described in the foregoing specification, it is to expressly understood that the invention is not limited thereto, as will now be apparent to those skilled in the art.

What is claimed is:

1. A method of strengthening articles of glass containing an element which is ionized at the temperature of electrical conductivity of the glass by ion exchange which comprises at least partially immersing a heated article of glass in an electrolytic bath of a melted salt, said glass being heated to a temperature between the temperature at which it is electrically conductive and the temperature at which it loses temper, said bath containing ions of a different size from but with the same electric charge as said ions in the glass, cooling and thereby solidifying a portion of the salt of said bath in position to form a barrier of electric insulation dividing the bath into a first volume in contact with one surface of the glass article and a separate second volume in contact with another surface of the glass, and flowing direct current electric power through the glass between the said first and second volumes of the bath.

2. The method of claim 1 including successively applying said electric power for a predetermined length of time, melting said barrier, and removing the glass article from the bath.

3. The method of claim 2 in which said electric potential is applied in one direction for a predeterimned time and then in the reverse direction for a lesser time such that the total load of electric power applied in the reverse direction is 0–50% of the total load applied in the first direction.

4. A method of exchanging ions in glass by means of an electric field which comprises submerging the glass in a molten salt containing the ion to be impelled into the glass, solidifying the bath about the portion of the glass in which the exchange is to take place, thereby establishing two baths separated from each other by the solid salt and the glass acting as a diaphragm, maintaining a temperature in the glass which enables it to transmit an electric field, and establishing an electric field through the glass between the baths.

5. The method of claim 4 in which the glass is soda lime glass and the salt is of potassium.

6. The method of claim 4 in which the glass subjected to the ion exchange is already tempered.

7. The method of claim 4 in which the molten salt is solidified by chilling, in a region which outlines the area in which the ion exchange is to proceed, until it solidifies and together with the glass separates two parts of the molten bath both physically and electrically, and an electric field is set up in the bath, through the glass, of different potential on opposite sides of the glass.

References Cited

UNITED STATES PATENTS

| | | | |
|---|---|---|---|
| 3,218,220 | 11/1965 | Weber | 204—130 |
| 3,287,200 | 11/1966 | Hess et al. | 65—111 |
| 3,317,297 | 5/1967 | Ray | 106—52 |

JOHN H. MACK, Primary Examiner

H. M. FLOURNOY, Assistant Examiner

U.S. Cl. X.R.

65—111; 106—52; 204—180